COLOR TELEVISION REPRODUCING SYSTEMS

Filed Oct. 5, 1953 2 Sheets-Sheet 1

INVENTOR.
Harry R. Lubcke

Oct. 15, 1957 H. R. LUBCKE 2,810,013
COLOR TELEVISION REPRODUCING SYSTEMS
Filed Oct. 5, 1953 2 Sheets-Sheet 2
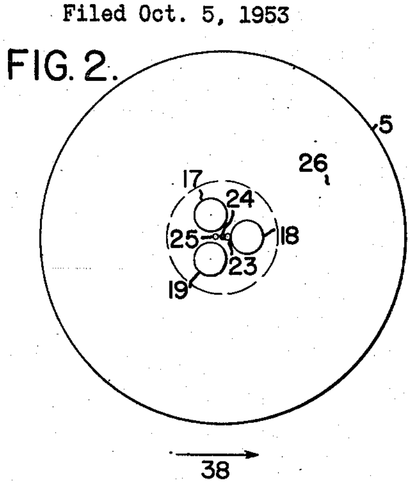
FIG. 7.
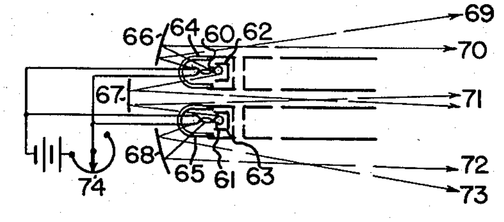
FIG. 9.
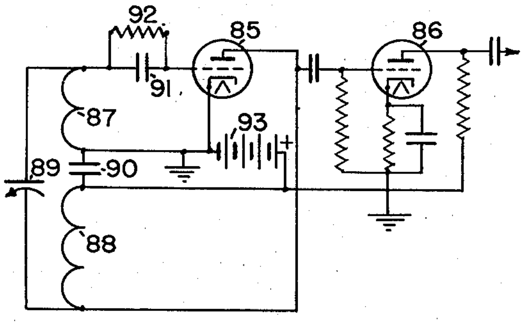
FIG. 3.
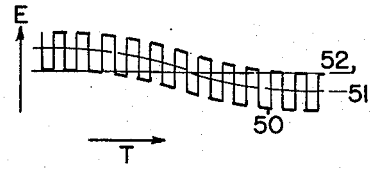
FIG. 11.
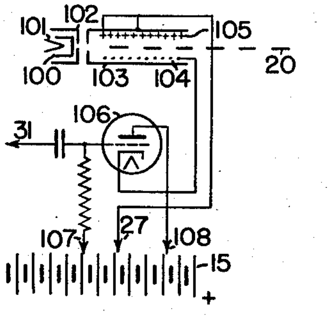
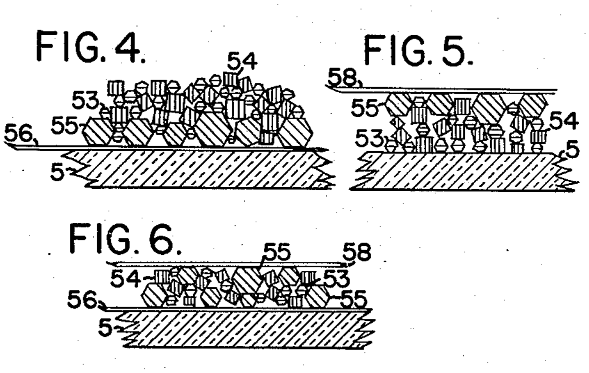
FIG. 8.
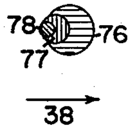
FIG. 10.
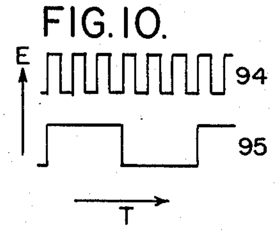
INVENTOR.
Harry R. Lubcke 2,810,013

COLOR TELEVISION REPRODUCING SYSTEMS

Harry R. Lubcke, Los Angeles, Calif.

Application October 5, 1953, Serial No. 384,119
18 Claims. (Cl. 178—5.4)

Figure 1:
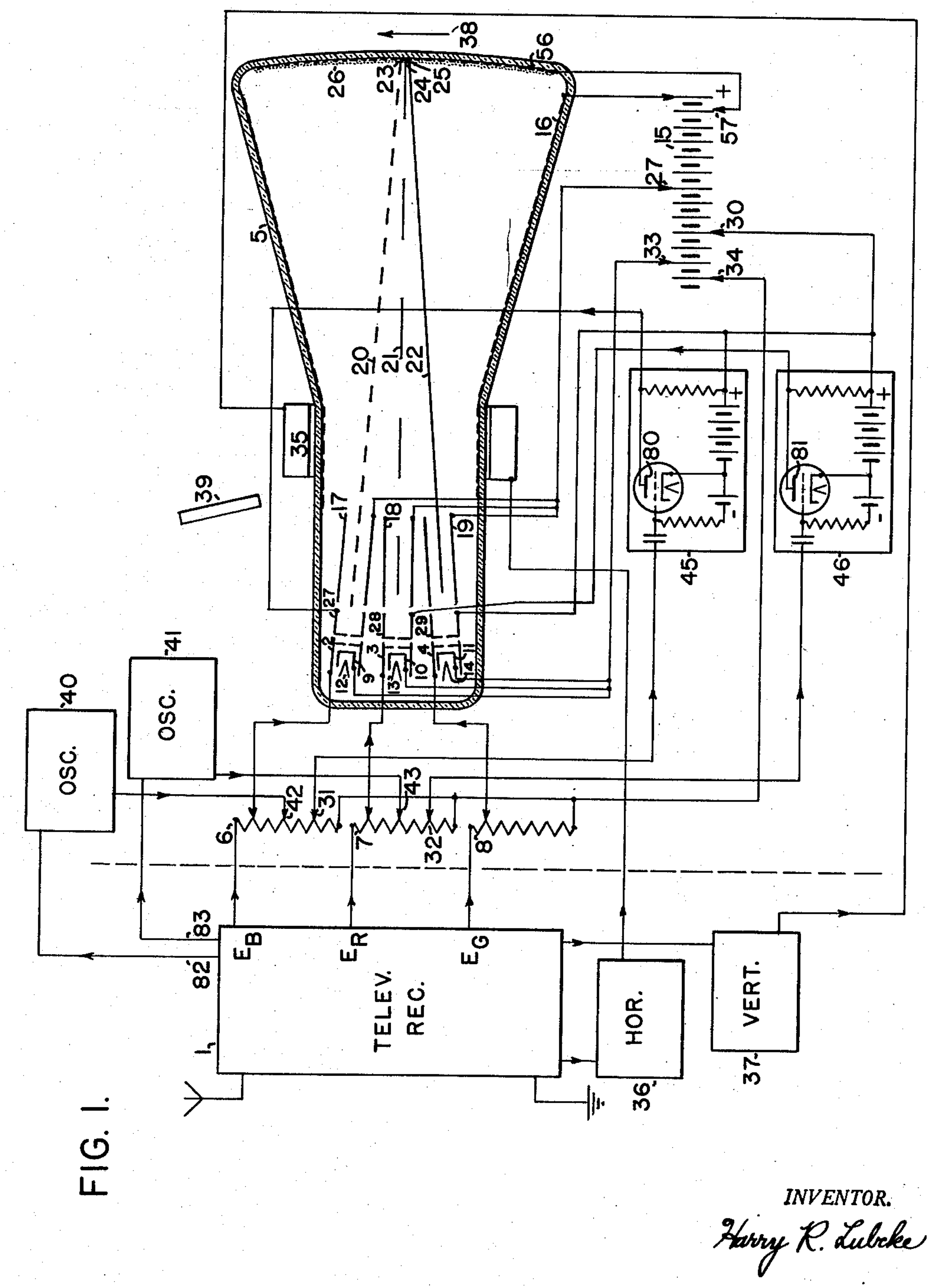

This invention relates to the art of reproducing color television images and more directly to a cathode ray tube system for simultaneously reproducing a complete color image.

Because a color television image conveys more information to the viewer than does a black and white image, color television reproducers have usually been structurally complex and inefficient in comparison with black and white reproducers. The plethora of accurately fabricated and positioned slats, wires, or perforated plates with companion accuracy of phosphor screen lines, surfaces or dots of the prior art has been characteristic of an elementary geometrical approach to the problem. The structural complexity results in high manufacturing cost, susceptibility to damage by vibration or mechanical shock, excessive weight, precision installation with respect to deflection components and possible damage to the structure by accidental maladjustment. Inefficiency arises with the inclusion of structures between electron sources and the reproducing screen. With a perforated plate as much as eight-tenths of the electrons otherwise suited for image light production are prevented from reaching the screen. Since these electrons heat the plate the energy that may be employed in the electron stream or streams is limited in practice below that which results in either a temporary or permanent deformation of the plate and consequent malfunctioning. This limitation directly limits the image brightness.

By invoking new cofunctioning in color image reproduction I am able to depart from geometrical means and thus avoid all the shortcomings above recited. To provide such a system is the principal object of this invention.

Another object is to provide a color image reproducer devoid of a recurrent elemental pattern such as is necessarily incurred with phosphor stripes, dots or the like.

Another object is to provide a color image reproducing system in which moire or other spurious patterns may not be produced by interaction of the scanning pattern with that of a color-determining structure.

Another object is to provide a color cathode ray tube which is relatively light in weight and rugged in handling and shipping.

Another object is to accomplish color television reproduction by correlating time-function characteristics impressed upon electron streams with excitation times and potentials of phosphor particles.

The ways in which these objects are attained is illustrated in the accompanying drawings, in which:

Fig. 1 shows a plan view of the cathode ray tube portion of my system with accompanying electrical circuits shown schematically, Fig. 2 is an end elevation view of the device, looking toward the viewing screen as would an observer, Fig. 3 shows an illustrative combination of video and interruption oscillator waveforms, Fig. 4 is an enlarged sectional elevation view of a portion of the light-producing screen, Fig. 5 is a similar view of an alternate screen, Fig. 6 is a similar view of another alternate screen, Fig. 7 shows a side elevation of an alternate arrangement of electron guns to direct infra-red radiation toward the phosphor screen, Fig. 8 shows an end elevation of an alternate arrangement of spots of light formed upon the viewing screen, Fig. 9 is a schematic circuit of an oscillator arrangement for interrupting electron streams, Fig. 10 shows preferred waveforms produced by circuits shown in Fig. 9, and Fig. 11 shows a side elevation of an alternate arrangement for altering the focus of an electron stream.

It is known that the time required for the decay of light emitted from phosphor transducers varies widely depending upon the particular phosphor, that it is constant for a given phosphor and that the time for excitation of a phosphor is proportional to its time of decay. Decay times vary from $10^{-7}$ seconds to a number of seconds, with excitation times shorter and proportional, according to a fixed ratio for any given phosphor. If two phosphors, for example, have considerably different excitation times and are exicted concurrently for a brief instant the one having the short excitation time will have emitted a relatively large amount of light before the one having the long excitation time will have started to emit. It is found that if a phosphor has not started to emit before the exciting energy is removed it will not transduce the energy already supplied to it into light. The theory involved may not be fully understood, but the presumption is that the electrons normally slated to produce light emission are first raised to only an intermediate excitation level according to a probability kind of mathematical function during the period of a brief excitation. The excitation then being removed, the electrons return to the (unexcited) ground-state level with the emission of heat or some other form of non-luminous energy, rather than with the emission of light as would occur were (electron stream impact) energy still being supplied.

If, then the rapidly responding phosphor is successively excited by relatively short period bursts of electrons it may apparently be contniuously excited without any excitation of the slowly responding phosphor which is simultaneously subjected to the same electron excitation. Since several interruptions to the microsecond are required for this functioning, the eye, which interprets repetitious stimulation as infrequent as ordinary fractions of a second as continuous, regards this much more rapid stimulation as unequivocally continuous.

By arranging that the rapidly interrupted phosphor be turned-off by the time successive electron streams designed to excite other phosphors on a heterogeneous screen arrive, essentially full excitation of the other phosphors can be accomplished without further (undesired) excitation of the prior phosphor. Briefly, the current density per cross-sectional area of the rapidly interrupted electron stream is adjusted to cause the rapid response phosphor to charge sufficiently negatively that electrons in succeeding streams will not impinge thereupon but will be very slightly deflected to adjacent phosphor particles of different characteristics. The proper degree of charge is accomplished by balancing the effect of a coefficient of secondary emission slightly less than one with leakage factors so that when the amount of light required of the rapid phosphor has been obtained no further light can be obtained therefrom regardless of electron impingement upon the screen until the relatively long interval of time before the next scansion of the particular area occurs.

For the typical color television system employing three primary colors I compound the above-described process one step more and provide phosphors of fast, intermediate and slow speeds of excitation; electron streams of rapid, intermediate and zero speeds of interruption; phosphor treatment to accomplish rapid, intermediate and zero capability of charging negatively as a function of time; and sequence of traverse of the electron streams over the phosphor screen in the order of most rapidly interrupted first, intermediate speed of interruption next and uninterrupted last. The temperature vs. light output characteristic of the phosphors selected is also preferably utilized as one of the bases of selection, a further factor which enhances the performance of this method of selective phosphor excitation. Because I employ three electron streams which may be separately and simultaneously modulated with color component video signals this apparatus is capable of reproducing color television images requiring simultaneous display of primary colors, such as is required by the National Television System Committee color television system at this time.

We now turn to the consideration of the detailed embodiment of my invention with the aid of the several figures.

In Fig. 1 numeral 1 indicates a television receiver. This constitutes the color image signal source insofar as the reproducing means is concerned. Not only may this source be the television receiver shown, but also such known portion of circuitry as required to supply the color image signal from a coaxial wire line or pair in a television transmitting station, in industrial television or the like.

A typical form of color image signal and receiving apparatus therefor is that of the National Television System Committee (NTSC) of which a description is given in the "Petition of National Television System Committee for Adoption of Transmission Standards for Color Television" before the Federal Communications Commission, Washington, D. C., publication NTSC–G–378, July 21, 1953; also, "Petition of Radio Corporation of America and National Broadcasting Co., Inc., for Approval of RCA Color Television System," June 25, 1953, before the same body. The latter reference includes block diagrams and receiver circuits for forming the subject color image signal utilized by my reproducer. In summary, a combined wideband intensity variation and reduced bandwidth color variation signal is supplied to all of the control grid elements 2, 3, 4 in cathode ray reproducer 5 of Fig. 1. The blue signal, $E_B$, is supplied from the receiver to potentiometer 6 and thence to grid 2, the red signal, $E_R$, to potentiometer 7 and to grid 3, and the green signal, $E_G$, to potentiometer 8 and to grid 4.

External connections are provided for each of the electrodes in cathode ray tube 5. This allows any known or expected color television system to be accommodated, since all possible control of the electron streams is afforded. It is only necessary that the resultant potential between grid 2 and cathode 9 be the blue primary signal, between 3 and 10 the red primary and between 4 and 11 the green primary in this typical embodiment. Should a four color system be desired, one more gun is added. In any case the proper signal potential may also be obtained by impressing the wide bandwidth luminance signal on all grids and the narrow bandwidth chrominance signals on the separate cathodes in another form of color signal previously proposed by the NTSC. As represented in Fig. 1, the apparatus to the left of the dotted line comprises the current typical embodiment of the NTSC color receiver first mentioned and that on the right my reproducer and its appurtenances.

For a sequential system the several guns are merely all biased to cut-off save one, that one being sequentially changed from color field to color field in accordance with the color of the incoming signal. In Fig. 1, a negative potential upon grids 3 and 4 of sufficient amplitude to prevent emission of electrons is applied when the blue image is transmitted, upon grids 2 and 4 when a red image and upon 2 and 3 when a green image.

Heaters 12, 13 and 14, one for each of cathodes 9, 10 and 11, are provided for causing electron emission therefrom in the usual manner. Means for supplying electrical energy to the heaters have not been shown in accordance with schematic custom, batteries or transformers being utilized in the known manner. The power supply for energizing other electrodes is shown as battery 15. The most positive tap thereof is normally connected to second anode 16; this being a conducting deposit on the inner surface of the cylindrical-conical envelope 5 or the metal wall thereof if of such allowed alternate construction.

The essential function of electrode 16 is to form converging electron lenses with first anodes 17, 18 and 19 of such strength as to focus the electron streams 20, 21 and 22 to small spots 23, 24 and 25 on transducing (normally phosphor) screen 26. The focus of some of these streams may be altered in certain embodiments of my invention to be discussed later but this is not contrary to the basic focusing action here described. First anodes 17, 18 and 19 are connected to a tap 27 at a less positive potential than anode 16 in order that the electrostatic lens action be obtained. All the first anodes are here shown connected to the same voltage tap for simplicity of illustration, but separate taps at approximately the same potential may be used in order to compensate for construction inequalities or to obtain somewhat different functioning between the guns, as to obtaining different degrees of focus as has been mentioned.

In the same way, second grids 27, 28 and 29 are maintained at approximately the same potential by connections shown to tap 30. These grids are preferably the electrodes upon which unequal potentials are applied for the purpose of securing different degrees of focus. The other apparatus shown associated therewith will be described later. It may be rendered inoperative for a simple embodiment by adjusting potentiometer contacts 31 and 32 to the bottoms of potentiometers 7 and 6.

The average or approximate potentials of the cathodes 9, 10 and 11 are determined by the position of tap 33 and those of grids 2, 3 and 4 by the position of tap 34 on battery 15. Again, the potentials of any of these electrodes may be separately adjusted in order to carry out this invention and the battery may be replaced with equivalent power supplies of known types, such as those operating from the usual 60 cycle power mains, a mains-powered radio frequency oscillator or the flyback surge of the rapid scanning frequency; rectifiers, filters and voltage dividers being other parts of these power supplies.

Electron streams 20, 21 and 22 are deflected horizontally (or in one dimension) over screen 26 by current flowing through coils on opposite sides of said streams in known deflection yoke 35, said current being of appropriate saw-tooth-like waveform from horizontal deflection source 36, synchronized by pulses contained in the received signal conveyed from receiver 1. The electron streams are deflected vertically (or in the other dimension) over the screen by current flowing through other coils positioned at right angles to those mentioned in deflection yoke 35 of appropriate waveform from vertical deflection source 37, also synchronized from the receiver. Common scanning deflection of all streams may also be accomplished by the known method of surrounding the streams inside envelope 5 with two pairs of deflection plates, one pair being supplied with synchronized deflection potentials of horizontal frequency and the other with potentials of vertical scanning frequency.

In any of the above embodiments the horizontal or line deflection means is constituted to cause the useful image-forming scan to occur in the direction of arrow 38 in Fig. 1, this being from left to right in the plan view of the device shown and in accord with current and proposed FCC and NTSC standards. The guns, identified by first anodes 17, 18 and 19 are physically oriented as shown to cause the corresponding electron streams to impinge in order, producing the adjacently placed spots of light 23, 24 and 25 on screen 26. Instead of purely physical orientation of the guns the aid of small permanent magnets such as the one shown at 39, or an electrostatic assymetry in each gun, may be enlisted to permanently deflect the electron streams one relative to the other so that the above configuration is achieved. Attention is also directed to the alternate placement of the guns in Fig. 2. Instead of being in-line as in Fig. 1 the guns are placed in essentially a 120 degree grouping at an optional angle to the horizontal but with a slight convergence to give the in-line placement of the spots. The requirement of this invention is that the spots occupy specified relative positions on the transducing screen and as long as assymetry does not result in improper television deflection or practical difficulty in construction it is of little importance as to exactly where the electron streams originate and what paths are taken to reach the screen. Oscillators 40 and 41 interrupt electron streams 20 and 21. Oscillator 40 is of highest frequency, of the order of 30 to 50 megacycles for known phosphors when traversed at the speed of television scanning, while oscillator 41 is of a lower frequency, of the order of 10 to 30 megacycles.

The output of oscillator 40, preferably of square waveshape, is conveyed to means for combining that wave and the blue video signal $E_B$, voltage divider 6, via tap 42. The combination is one of superimposition, not of modulation; as is shown in Fig. 3. Here waveform 50 is the one from the oscillator and the slower variation 51 is illustrative of the video color signal waveform. Horizontal line 52 is the voltage level of the grid-cathode cut-off for the "blue" gun 17 in reproducer 5. The amplitude of waveform 50 is substantially that of the total normal characteristic of the blue gun, from electron stream cut-off to zero potential on grid 2. The video waveform 51 is of similar amplitude in this illustration, representing the maximum signal excursion. The constant value of the bias is determined by the positions of adjustable taps 33 and 34 on battery 15, and this is normally set more negative than cut-off by half the peak-to-peak amplitude of waveform 50 as will be noted as the zero signal condition at the right hand side of Fig. 3.

The effect of this combination of waveforms is to substantially or completely interrupt the electron stream emitted from blue gun 17 during alternate half cycles of the multi-megacycle waveform 50. This is shown in Fig. 3 by each of the lower excursions of waveform 50 reaching the cut-off axis 52 or passing below it and in schematic representation in Fig. 1 by the dotted line representing electron stream 20.

In an analogous manner the output waveform of oscillator 41 is combined with the red video signal $E_R$ at tap 43 of voltage divider 7. The signal amplitudes are the same as shown in Fig. 3. The only difference is the frequency of interruption of the electron stream, which is slower than before and thus represented by dashes 21 in Fig. 1.

In operation, it will be seen that rapidly interrupted stream 20 will first impinge upon any given area of the phosphor screen. The periods of electron impact are so rapidly consummated that, in combination with the effect of the scanning motion of the stream, only the rapidly excitable phosphor gives any visible response. A suitable phosphor is zinc sulphide having 0.01% silver as activator and being hexagonally crystallized. It emits blue light. This phosphor is high in efficiency at room temperature but reduces greatly in efficiency at temperatures induced by electron bombardment. It is a part of transducer screen 26, being particles 53 in the enlarged fragmentary sectional views, Figs. 4, 5 and 6. These figures show the screen in horizontal position, as for settling the phosphor particles during manufacture. The screen is normally used in the vertical position as shown in Fig. 1. The phosphor 53 particles are crystallized rather small, a thousandth of a millimeter across, so that heating occurs fairly rapidly; that is, of the order of a fraction of a microsecond while the electron streams are impinging. What is more, the coefficient of secondary emission decreases with increase in temperature. Also, it is possible to initially coat these particles with a thin coating of silica by known methods of chemical precipitation or with a thin coating of a metal or quartz by vacuum evaporation. These three substances have secondary emission ratios considerably less than those of phosphors. By attention to the fabrication of the phosphor as used it is thus possible to provide particles 53 that will give light emission under a rapidly interrupted electron stream for the brief period required for television scanning but will cease to emit under a following less rapidly interrupted or an uninterrupted stream.

The less rapidly interrupted electron stream 21 impinges next upon a given area of the phosphor screen. In the typical television image the rapid response phosphor described above has been excited sufficiently to be charged negatively and to repel electrons, these striking other phosphors immediately adjacent. Since the deflection required is never more than the order of one two-thousandth of a millimeter there is no problem of adequate transverse deflection potential at the screen as may occur in wire, slat or equivalent structures of much greater transverse separations in which color selection is obtained by systematicaly cross-deflecting an electron stream as a whole to relatively vast areas of one phosphor. Thus, the less rapidly interrupted stream 21 excites phosphor 54 of intermediate speed of response and charge-up. The slow speed of response phosphor 55 is not excited because the response thereof during the brief periods of impact of stream 21 is negligible.

A suitable intermediate speed phosphor 54 is red light emitting zinc sulphide with approximately 4% manganese as activator, the phosphor being formed in cubic crystals, preferably of larger size than the rapid phosphor 53 previously described. The speed of excitation, of decay and the efficiency are all intermediate for phosphor 54.

The final electron stream to impact a given area of the phosphor screen is the uninterrupted one 22. Both previously excited phosphors now being charged negatively, this stream impacts steadily upon the remaining slow speed of response phosphor 55 and excites it according to the intensity of the stream as determined by the green video signal $E_G$, applied between control grid 4 and cathode 11.

A suitable slow phosphor 55 is zinc sulphide with copper less than one part per ten thousand by weight and iron less than one part per hundred thousand by weight as activators, which emits green light. This phosphor is formed in hexagonal crystals which may be relatively large in order that they be less easily heated when subjected to electron stream bombardment than either of the two previously mentioned phosphors.

One suitable form of my phosphor screen is shown in Fig. 4. The arrangement of the several phosphors is completely random and quite the opposite of printed dots or ruled lines of single-phosphor areas often resorted-to in the art, at considerably greater difficulty of construction and greater manufacturing cost. I prefer, but do not require, a transparent conductive coating 56 on the glass substrate of the screen such as the "EH" or "NESA" coatings known to the trade. This is for the purpose of providing a degree of thermal conductivity to keep the slow phosphor relatively cool and to allow the general potential of the screen to be under control by proper electrical connection at adjustable tap 57 on battery 15, Fig. 1. The slow phosphor 55 particles are preferably deposited first so that most of them will be in contact with the conductive coating, to prevent any possibility of charge-up and for thermal reasons as stated. Since large particles settle first in any combination of sizes, simultaneous liquid or air settling may be utilized if time is important in manufacture.

The inherent conducivity of the several phosphors is adjusted in synthesization to allow the phosphor screen to discharge to a uniform potential approximating that of the highest potential electrode in the cathode ray tube in the interval of a scanning field or frame. This conduction may alternately be provided by including very finely divided conducting particles randomly distributed with the phosphor particles during the deposition process, the volume thereof being considerably less than the total volume of phosphors deposited, this and the conductivity of the material being adjusted to discharge the screen in the approximate interval mentioned. The range from colloidal metal through carbon and graphite to inert semiconductors is available as to conductivity. Finally, irradiation with energy causing electron emission or highly increased conduction of the phosphors may be utilized as long as the phosphors are not stimulated to transduce the energy to visible light and thus the screen to glow as a whole.

An operative embodiment of my invention has now been described and the way in which a number of its objects are attained has been shown.

An alternate arrangement as to the phosphor screen is shown in Fig. 5. In a word, the screen is turned inside out and the former conductive coating 56 becomes aluminized backing 58. In this embodiment the rapid and intermediate speed of response phosphor particles 53 and 54 are first deposited at random upon the inner surface of envelope 5. Thereafter the large slow speed particles 55 are deposited and the screen aluminized according to known methods in a manner to make contact with the major portion of these crystals. Backing 58 is connected to the adjustable potential tap 57 of battery 15 in Fig. 1 in place of former coating 56. In this arrangement the rapid phosphor 53 charges negatively first and the intermediate phosphor 54 next as before but since these phosphors are now away from the direction of electron impact segregation for sequential excitation more effectively occurs. From what has gone before it will be understood that a combination of the arrangements of Figs. 4 and 5 is also possible. This is shown in Fig. 6. Slow phosphor particles 55 are deposited in contact with both conductive surfaces and by utilizing separate taps 57 for coating 56 and backing 58 close control over phosphor potentials and electron fields may be exercised. It is seen that a number of combinations of controlling factors are available for accomplishing selective excitation of a plurality of phosphors.

An alternate arrangement in which infra-red radiant energy is utilized to quench an otherwise long decay of the slow phosphor will now be described.

Fig. 7 shows the alternate construction of the gun end of cathode ray tube 5 of Fig. 1. A sectional view of only two of the guns, as 17 and 19 in Fig. 2, is shown for clarity; gun 18 is behind those shown and is similarly constructed and arranged. In order to insure an adequate amount of infra-red radiation, heater electrodes 60 and 61 are somewhat larger than usual practice and extend farther out of cathodes 62 and 63. The heaters are preferably proportioned and thermally related to the cathodes so as to operate at a dull red heat rather than at an orange or yellow temperature to enhance the amount of infra-red energy produced. Infra-red filters 64 and 65 are provided to block visible radiation from the envelope in general. These are of the known semi-glass vitreous type capable of withstanding heat during operation and during the bake-out process of cathode ray tube construction. Elements 66, 67 and 68 are sectional portions of one or a plurality of roughly parabolic surfaces adapted to reflect radiation from heaters 60 and 61 to the phosphor screen 26 of Fig. 1 (not shown in Fig. 7). Ray paths of such energy are indicated by numerals 69 through 73.

The infra-red energy floods the whole area of the phosphor screen at an intensity adjustable by altering the magnitude of the electric current through the heaters, this being regulated by a rheostat 74; a serviceman's adjustment on the receiver. The rapid and intermediate speed phosphors are unaffected by the infra-red radiation because of the phospho-chemical nature thereof. Contrariwise, the slow zinc sulphide with copper and iron activator is quenched; that is, the decay of light emission is caused to cease relatively quickly after the peak response following excitation by the electron stream rather than to continue for a relatively long time as normal for this phosphor. In this way I am able to secure roughly equivalent decay rates for the three phosphors. This prevents a color fringe on rapidly moving objects in the television image.

It is to be noted that the overall efficiency of this envacuo arrangement is high in the infra-red in comparison with known infra-red lamps or external irradiation of the cathode ray tube. In these known devices one or more glass envelopes greatly decrease the effective radiation upon the phosphors. Thus the nominal wattage of the gun heaters and the partial reflectors provide sufficient infra-red for the effect desired. It will also be noted that the temperature of the screen may be adjusted in some measure by adjusting rheostat 74, thereby altering the time of cessation of light emission of the more rapidly excited phosphors under electron bombardment by virtue of the temperature characteristic of the phosphors.

In another alternate embodiment an increase in the length of the intensity characteristic of the "rapid phosphor" primary colors is obtained. The charge-up phenomena of these phosphors has been mentioned. This is to accomplish successive selective excitation of phosphors upon a given screen area. It is desirable that the minimum intensity range characteristic of the short and the intermediate phosphors be restricted to avoid appreciable malstimulation when image subject matter may not contain these primaries. Such conditions occur in test patterns and color bar test slides but it is well known that these rarely occur in nature or the pleasing colorations of man.

If the cross-sectional size of the modulating electron stream increases with amplitude of the video signal corresponding to the rapid and/or the intermediate phosphor speed colors greater visual response will be obtained than with a stream of constant cross-section. Although the rapid phosphor, for example, charges negatively to extinction with the impingement of a certain number of electrons and this number is insufficient to give the visual stimulation necessary to adequately reproduce the color of the original object before the camera, should the spot size increase on the phosphor screen new rapid phosphor particles are influenced and a larger excited area obtained, the total period of time over which successive portions are excited being longer than otherwise. Physiological optics teaches that the visual impression obtained from any short-time phenomena depends not only upon the brightness thereof but also upon the period of excitation (Talbot's law), and where visual acuity is concerned, with the size of the illuminated spot. In common with all television reproduction phenomena the elemental size of these color spots lie at the limit of visual acuity. Images are viewed at that distance where color and/or scanning line structure just disappear, or where these may be noted but not considered objectionable.

A "follow the leader" type of color spot progression in scanning was illustrated by the positions of spots 23, 24 and 25 in Figs. 1 and 2. When alteration of focus is invoked this is changed to a "progressively diminished size" type of color spot placement as shown in Fig. 8. In the example illustrated the cross-section of the blue electron stream has been increased to a practical maximum and has resulted in the large blue fluorescent spot 76. The cross-section of the red electron stream has been increased somewhat to give more red to the resultant color of the image at the point chosen than would be obtained had the spot 77 remained at the original size of Figs. 1 or 2. Finally, the spot size 78 of the uninterrupted electron stream remains the same, since a charge-up cut-off is not employed for the slow green phosphor utilized.

Obviously, the size of the green stream could be altered in a broad application of this new principle but in the interest of simplicity of description apparatus is not described for such purpose herein.

Alteration of focus with video signal is accomplished by changing the potential of a focus-controlling electrode in the electron gun involved. Thus, in Fig. 1 the potential of the second grid 27 of the rapidly interrupted gun is affected by the focus-changing circuitry 45. This is simply a single video frequency amplifying stage, mainly for the purpose of isolating the focus electrode from the combining potentiometer 6. The bandwidth of amplifier 45 is approximately the same as that of the video amplifiers in receiver 1. An increase in the amplitude of voltage output is desired, in general, thus the amplifier output is taken from the plate 80 of the vacuum tube; Fig. 1. The input is taken from tap 31 of the blue signal potentiometer 6. By adjustment of this tap the desired proportion of the video signal is obtained for change in the corresponding spot size with video modulation.

It is not of first order importance whether the voltage change on focus-controlling electrode 27 increase or decrease from the value which gives focus, since defocus occurs on either side of that adjustment. The basic potential for electrode 27 is determined by the adjustment of the overall focus adjustment, tap 30. In an electrostatic-focused embodiment I have found that a change in the cathode to second grid potential of 7.6% gives a spot size change of two to one. This is a desirable ratio for moderately lengthening the modulation characteristic since four times the phosphor area is impacted. Greater ratios may be used, limited only by noticeable defocus in the image. The fully focused spot size in this color cathode ray tube is preferably set at less than the pitch between scanning lines of the image by suitably proportioning aperture sizes and electrode voltages.

The 7.6% voltage change mentioned means that the peak to peak video voltage required from amplifier 45 is of the order of 25 to 100 volts, an amplitude easily obtained with usual receiver type components. In a magnetic focus embodiment the cathode to second grid potential change for a two to one spot size change is 24%, this change being equal to 60 volts. Thus a design range of video output from amplifier 45 of from 25 to perhaps 150 volts peak to peak accommodates various electron gun structures and a desirable range of defocus. Over these ranges of change in spot size the monochromatic spot intensity remains approximately the same. Consequently, the intensity of any color is essentially a function of the cathode to grid voltage on the particular gun involved; i. e., according to the intensity of the video signal, as usual. This is desirable, though not essential, in this art.

In a similar manner, focus amplifier 46 alters the potential of second grid 28 of the less rapidly interrupted gun, plate 81 being connected to the second grid and the input amplitude to the stage being obtained from the red signal potentiometer 7 via adjustable tap 32. This tap is normally adjusted to a lower signal amplitude value than tap 31 so that the second electron stream will impinge in nearly all conditions of use upon a phosphor screen area which has been previously impacted by the rapidly interrupted electron stream and over which therefore the rapid phosphor will have charged negatively to extinction.

As an arrangement alternate to obtaining increased spot size by separate instrumentalities, the known phenomenon of "blooming" of the cathode ray tube spot may be employed. This prenomenon is a natural one but has been reduced to a small value in advanced cathode ray tube design. Blooming herein is allowed to occur by omitting a defining aperture at the first cross-over in the gun for the rapidly interrupted electron stream 20, or by altering the structure of the control grid electrode 2 to exercise an increased electron lens effect upon the focal parameters of the gun. These factors are incorporated to a lesser extent in the gun forming the less rapidly interrupted stream 21 and the gun forming the uninterrupted stream 22 is constructed according to advanced practice.

In such instances of image formation as may omit the rapid and the less-rapidly interrupted color components the constantly excited color is merely somewhat desaturated. This effect occurs to some extent in known color tubes. In the perforated plate or shadow mask tube incorrect electron stream trajectory causes impingement of a portion of the stream upon incorrect phosphor dots and lack of accuracy in manufacture may easily have permanent desaturation effects. In the tube of this invention two factors reduce desaturation; the extended video characteristic of defocus is always absent when the corresponding guns are not excited and the uninterrupted electron stream charges the rapid and/or less rapid phosphors to cut-off with great rapidity, reducing the visual stimulation in accordance with Talbot's law and presenting an even shorter characteristic than under impulse excitation where some decay between incremental excitations results in a longer overall characteristic.

It is important that devices be assessed as to practicality in the art rather than compared with theoretical perfection. Color television receivers are provided with a color control for arbitrarily changing the degree of saturation of the colors to allow the viewer to suit his own taste. This satisfies the same human trait which dictated purposely introduced distortion in sound reproduction with the tone control. More recently the television receiver industry has forsaken black level restoration so that a tolerable image will be obtained with any misadjustment by an inexperienced user at the expense of gray images when these should be black to all users. Thus, minor desaturation in the color art will not be noticed.

A preferred circuit for interruption oscillator 40 is shown in Fig. 9. Vacuum tubes 85 and 86 may be opposite halves of a receiving type twin triode. Coils 87 and 88 are of few turns, small diameter and air core, and frequency-determining capacitor 89 is of a few microfarads capacitance. This LC combination tunes to a convenient frequency in the 30 to 50 megacycle range previously mentioned. Capacitor 90 is merely bypass, mica, of the order of a hundredth of a microfarad. Grid condenser 91 is of smaller value than capacitor 90 and grid leak 92 has a value of several kilohms. Battery 93 represents any suitable D. C. plate voltage supply. Vacuum tube 86 is an amplifier which is overdriven in both positive and negative directions by the oscillator proper so that an essentially square waveform such as 94 in Fig. 10 is obtained. This output is conveyed at a level of a number of volts suitable to accomplish the function previously described in connection with Fig. 3, being connected to the variable contact arm 42 of the blue signal potentiometer 6 in Fig. 1.

In a similar manner oscillator 41 is composed of equivalent circuitry with larger coils and/or capacitor 89 to give a frequency in the range 10 to 30 megacycles. This output has the appearance of waveform 95 of Fig. 10 and is connected to variable contact arm 43 of the red signal potentiometer 7 in Fig. 1.

It is not necessary that the oscillator waveforms be square waves. Since the top and bottom of a sine wave is the slowest change in amplitude with time and the half-way point is the fastest, the function of turning on and off the electron stream is accomplished with creditable efficiency. Maximum efficiency is achieved with the square wave since the electron stream is either fully on or fully off at essentially all periods of time. A triangular waveshape should not be employed.

The amplitude of the waveform from the oscillators is only slightly larger than that of the video signals at the combining potentiometers, thus the power level is no greater than that of other oscillators found in receiver 1. With normal shielding and circuit techniques interference to other receiver functions or to other services is not produced.

It is not necessary that oscillators 40 and 41 be synchronized to scanning or subcarrier frequency since the function performed is only in relation to the rate of excitation of phosphors composing screen 26. Assynchronism with scanning causes what structure of elemental light areas may be produced during one scanning field to be something randomly different during the next, preventing even a minute line or dot structure found in other color cathode ray tubes. Should synchronism to scanning or subcarrier frequency be desired for some reason this is accomplished by impressing a nominal amplitude of voltage waveform of the required frequency upon the grid of vacuum tube 85, Fig. 9, of oscillator 40 via lead 82 in Fig. 1, and the same or similar energy to oscillator 41 via lead 83.

Not only may the focus of the individual guns be varied by electrostatic means as has been previously described but also by magnetic means as illustrated in Fig. 11. The structure for one gun is shown. Cathode 100, heater 101 and control grid 102 are conventional or as taught elsewhere in this specification. First anode 103 is unconventional in having a solenoidal coil wound therein, shown diagrammatically as heads of arrows of electric current 104 at the bottom of the convolutions and tails of arrows 105 at the top. This coil is energized with color video current at a level of several milliamperes from a focus amplifier such as 45, though in this embodiment altered to give a low impedance cathode follower output as further shown in Fig. 11. Vacuum tube 106 preferably has a curved characteristic and is biased to cut-off by an appropriate potential from tap 107 on battery 15. For small values of color video signal there is little or no current flow in coil 104—105. For increased signal levels current does flow and electron stream 20 is defocused as required. The stage input is taken from tap 31 as previously. The D. C. operating potentials for tube 106 are derived around tap 27 and the coil 104—105 connected to anode 103 to simplify insulation problems between coil and anode. With due attention to the altered electrostatic field presented, the coil may be insulated from the anode and the circuitry evolved around usual ground potentials.

In this embodiment for magnetic defocusing the electron stream is affected prior to full acceleration and the magnetic field required is considerably less than proportional to the main magnetic field utilized for magnetic focusing. The coil 104—105 requires several dozen turns in practical use. The turns may be positioned nearer the exit end of the anode than the electron entrance end in order to minimize effects upon the electrostatic electron optics of stream formation and control. Overall focus of all electron streams is accomplished by the known focusing coil technique or by electrostatic means shown in Fig. 1.

How the several objects of this invention are accomplished is now evident.

Modifications of the embodiments described and illustrated are possible under the teaching of this invention. Other phosphors or transducers may be employed, the characteristics of which have been set forth in the examples given. Also, more than one phosphor compound may be utilized for each of the previously mentioned phosphors, thereby securing a choice in the spectral characteristic of the primary color involved. It is merely necessary that the speed of response, secondary emitting characteristic, temperature characteristic and/or capability of assuming a negative charge be approximately the same for the two phosphor compounds which are to act as a single phosphor as previously described and shown in Figs. 4, 5 and 6. An example of another rapid blue phosphor is zinc sulphide without (known) activator, crystallized at a relatively high temperature to give rapid response and for a short time to give small crystals, these being cubic. An anti-secondary electron emitting treatment is desirable.

The plurality of electron streams may be reduced to two, interrupted and non-interrupted, for a two color system, or increased beyond three for complicated systems, several different rates of interruption being used with corresponding speed of response phosphors.

The connections shown at potentiometers 6 or 7 may be interspersed between additional amplifier stages should isolation of one circuit from another be required.

For a simultaneous color television system of the ordinary multi-channel type one channel is connected between the grids and cathodes of each of the several guns.

The cathode ray tube may be constructed with either all-glass or metal and glass in either round or rectangular form. Ion traps may be included in each electron gun and the zero potential constant focusing gun may be employed when the solenoid coil alternate is utilized to provide modulation defocus or when the gun is otherwise designed to accomplish modulation defocusing by spot blooming. Should it be necessary to reverse the direction of line scanning (arrow 38) the connections to grids 2 and 4 and 27 and 29 are interchanged, which interchanges electron streams 20 and 22.

The cathode ray tube may be modified for color-modulating white-light projecting means by substituting potassium chloride, bromide and other compounds synthesized and treated to exhibit different rates of color-opacity buildup and secondary electron emission as taught.

Numerical values for preferred characteristics and operating values of my system have been given to most distinctly teach how it is to be constructed and used. Obviously, the invention is not limited to these quantities, nor to the proportions shown in the figures, and the teaching will allow one skilled in the art to depart considerably therefrom without requiring further invention.

Having thus fully described my invention and how it is to be practiced, I claim:

1. A color television cathode ray reproducing system comprising an evacuated envelope, means for producing plural independently modulatable electron streams therein, means to deflect said streams for television scanning, a phosphor screen within said envelope disposed to receive the impacts of said electron streams, said screen composed of the same plurality of different phosphors as electron streams, said stream-producing means arranged with respect to said deflection means to cause said streams to impact any given area of said screen successively, means to individually interrupt each of said electron streams at a rate approximating the time interval required for exciting one of said phosphors save the last said stream, the rate of interruption of the first said electron stream to impact any given area of said screen being most rapid, that of the second said stream being less rapid and the last stream of said plurality not being interrupted by said means to interrupt said electron streams.

2. A color television reproducing system comprising a plurality of sources of electron streams, a transducing screen having a plurality of transducers of different excitation times which emit different colors, said sources positioned to direct said streams to an area upon said screen approximately defined by the sum of the individual cross-sectional areas of said electron streams arranged one beside the other in a linear fashion, means connected to said sources to change the number of electrons in said streams each in accordance with one component of color, means connected to one of said sources to interrupt the electron stream thereof at a given rate, further means connected to another of said sources to interrupt the electron stream thereof at a different rate, both of said rates being several times more rapid than any said change in the number of electrons in either of said streams, and means for deflecting said streams in a direction parallel to the major dimension of said linear stream arrangement for television line scanning and of sense that the most rapidly interrupted stream first traverse said screen area.

3. The color television reproducing system of claim 2 wherein the plurality of electron stream sources is three, one said stream being interrupted many times more rapidly than the period of any said change in the number of electrons in said stream, the second stream interrupted less rapidly than the first said stream but still more rapidly than the period of any said change in the number of electrons in said second stream, and the last said stream not interrupted at all.

4. The color television reproducing system of claim 2 in which the waveforms of the interruption sources are essentially square waves.

5. The color television reproducing system of claim 2 in which the transducers have different excitation times and secondary emission ratios proportional to the duration of said excitation times.

6. A color television cathode ray reproducing system comprising in combination an evacuated envelope, electron stream-producing guns therein, a phosphor screen spaced from said guns and in the path of said electron streams produced thereby, means to simultaneously deflect all said electron streams according to television scanning, said guns placed to cause said streams to successively impact said screen as so deflected, oscillatory means external to said envelope and electrically connected to one said gun to rapidly interrupt the electron stream which first intercepts a given area of said screen, similar means to less rapidly interrupt the electron stream which next intercepts the same area of said screen, one of the phosphors upon said screen emitting light of one primary color when impacted by said rapidly interrupted electron stream and constituted to accumulate a negative charge sufficient to prevent electron impingement thereupon after said impactment, another of the phosphors upon said screen emitting light of another primary color when impacted by said less rapidly interrupted electron stream and constituted to accumulate a negative charge sufficient to prevent electron impingement thereupon after said impactment, still another of the phosphors upon said screen emitting light of another primary color when impacted by an uninterrupted electron stream and constituted not to accumulate an appreciable negative charge, means to conduct said negative charges from said phosphors prior to the return of said electron streams to said given area and means to control the number of electrons in each of said electron streams in accordance with the color video signal corresponding to the primary color reproduced upon said screen by said stream.

7. A system in accordance with claim 6 wherein the cross-sections of said interrupted streams increase in proportion to the amplitude of the video signal applied thereto at a rate in proportion to the rapidity of interruption of said stream.

8. The color television reproducing system of claim 6 wherein the means to conduct said negative charges from said phosphors comprises a metallic backing over said phosphors through which said electron streams pass, said backing maintained at a constant potential with respect to that of said guns.

9. The color television reproducing system of claim 6 wherein the means to conduct said negative charges from said phosphors comprises an essentially transparent conductive coating between said phosphors and said evacuated envelope and a metallic backing over said phosphors through which said electron streams pass, said coating and said backing maintained at constant potentials with respect to that of said guns.

10. In a color television cathode ray reproducing system means for selectively producing different primary colors from a plurality of corresponding phosphors subjected to simultaneous impact of a plurality of electron streams comprising means for producing plural electron streams, phosphors randomly disposed upon a surface in the path of said streams, said means for producing said streams positioned to cause said streams to impact said surface upon small contiguous areas, means to simultaneously deflect said streams over said surface according to a television scanning path, means to modulate each stream according to the video signal of a primary color of the television image to be reproduced, one of said phosphors having a brief time of excitation, temporary fatigue under relatively prolonged excitation and a secondary electron emission capability such as to rapidly charge negatively under excitation, means to rapidly interrupt the first of said electron streams to impact any given small area of said phosphor surface, said one phosphor and said rapidly interrupted stream coacting to reproduce the one primary color of said image with which said stream is modulated, another of said phosphors having a longer time of excitation, a reduced degree of temporary fatigue under prolonged excitation and a secondary emission capability such as to charge negatively at a slower rate than that of said previous phosphor, means to interrupt the second of said electron streams to impact said area at a slower rate than that of said first stream, said other phosphor and said second stream coacting to reproduce another primary color with which said stream is modulated, still another of said phosphors having a relatively long time of excitation, freedom from temporary fatigue and a good secondary emitting capability such as to prevent charging negative, and a third uninterrupted electron stream to impact said area, said still other phosphor and said third stream coacting to reproduce still another primary color with which said stream is modulated, means adjacent said phosphors to discharge the same prior to the return of the electron streams to each given area of said surface for repeating the described coaction, and means actuated by the video signals controlling the modulation of said interrupted streams for increasing the cross-section thereof with amplitude of said signals to produce greater effective light output of the corresponding primary color.

11. The color television reproducing system of claim 10 wherein the means adjacent said phosphors to discharge the same comprises an essentially transparent conductive coating between said phosphors and said surface, said coating maintained at a constant potential with respect to that of said means for producing said electron streams.

12. The color television reproducing system of claim 10 wherein said means for increasing the cross-section of an electron stream comprises a coil of wire within an electrode of one of said means for producing plural electron streams.

13. A color television cathode ray reproducing system comprising an evacuated envelope, means for producing plural electron streams therein, means for independently modulating each electron stream with one independent signal component of the color image to be reproduced, means to deflect said streams for television scanning, a phosphor screen within said envelope placed to receive the impacts of said electron streams, said screen composed of the same plurality of different phosphors as electron streams, said phosphors randomly disposed as to the positions of individual unlike phosphor particles but essentially uniformly distributed as to the total numbers of each kind of phosphor particles per unit area of said screen, said stream-producing means arranged with respect to said deflection means to cause said streams to successively impact said screen, means to interrupt said electron streams at rates approximating the time intervals required for partial excitation of said phosphors, the rate of interruption of the first said electron stream to impact any given area of said screen being the most rapid, that of the second said stream being less rapid and that of the last stream of said plurality being uninterrupted by said means to interrupt said electron streams, less than the full plurality of said phosphors being constituted to charge negatively upon impact of said electron streams, the most rapidly excited phosphor charging most rapidly negative, the next most rapidly excited phosphor charging next most rapidly negative, and the least rapidly excited phosphor not charging negative, means for removing said charges prior to the time said electron streams again impact a given area, other means for altering the focus of said electron streams from small to larger cross-section at increasingly larger values of said independent color signal components, the increase in size of the cross-section of the stream to first impact any given area of said screen being at the greatest rate with respect to the amplitude of said signal component applied thereto, that of the second said stream being at a smaller rate and that of the last stream of said plurality not increasing with said signal component applied thereto, and means to influence said screen to considerably curtail the duration of the emission of light from the phosphor having the longest time interval required for partial excitation.

14. The color television cathode ray reproducing system of claim 13 wherein the means to influence the screen comprises a source of infra-red radiant energy contained within said evacuated envelope and arranged to radiate said energy to said screen.

15. The color television cathode ray reproducing system of claim 13 wherein the means to interrupt an electron stream comprises an oscillator and means connected thereto to limit the excursions of the oscillator output energy to values accomplishing either substantially complete interruption or substantially uniform flow of said electron stream at successive instants of time.

16. A color television cathode ray reproducing system comprising an evacuated envelope, three electron guns therein for forming three electron streams directed at closely adjacent partially overlapping areas upon a surface, said surface positioned approximately perpendicular to the electron-optical exit axis of said guns, three different primary color emitting phosphors intermixed as to relative placement of phosphor particles and substantially uniformly distributed as to the amounts of each per unit area over the area of said surface, means electrically connected to said guns for modulating the light-producing effectiveness of each electron stream with a video signal corresponding to one primary color of the television image to be reproduced, means associated with said guns to completely and cyclically interrupt two of said electron streams at a rate considerably in excess of the variations of said video signals, one said rate corresponding to the time interval required to excite the most rapidly stimulatable of said different phosphors to light emission, the other said rate corresponding to the time interval to excite the next most rapidly stimulatable of said different phosphors to light emission, means to deflect said electron streams over said surface for television scanning, said guns directed toward said surface such that the electron stream interrupted at said rapid rate first impinges upon a given area, said stream interrupted at said next most rapid rate next, and said uninterrupted stream last, said most rapidly stimulatable phosphor constituted to rapidly charge negatively upon impingement of electrons, said next most rapidly stimulatable phosphor constituted to less rapidly charge negatively upon impingment of electrons and said third phosphor constituted to not charge appreciably upon impingement of electrons, conductive means to remove said charges prior to the next impingement of said electron streams upon the same area according to television scanning, means connected to said guns to increase the cross-section of said most rapidly interrupted electron stream at said surface with increased amplitude of said video signal modulating the same, and means to increase a lesser amount the cross-section of said most next rapidly interrupted electron stream with increased video amplitude modulating the same, and irradiating means to considerably curtail the duration of emission of light after excitation from the phosphor having the longest time interval required for excitation.

17. A color television cathode ray reproducing system comprising in combination a cathode ray tube having an evacuated envelope, guns for producing three electron streams therein, a viewing screen positioned to receive the impact of said electron streams, said screen composed of phosphors emitting three primary colors and a conductive surface for adjusting the potential thereof, means to completely interrupt two said electron streams at different rates, means to vary the cross-section of said two electron streams according to the video signal modulating the intensity thereof, the variation of cross-section of said stream interrupted at the most rapid rate being the greatest, means for simultaneously deflecting all said streams over said screen according to television scanning, said guns oriented to cause the most rapidly interrupted electron stream to traverse said screen first, said less rapidly interrupted stream closely following said prior stream and the uninterrupted stream closely following said less rapidly interrupted stream, said phosphors constituted differently, one group exhibiting one primary color being rapidly excitable by said rapidly interrupted stream and constituted to charge negatively when thus excited to a potential sufficient to prevent impingement of successive electron streams, a second group exhibiting another primary color being less rapidly excitable and excited by said less rapidly interrupted stream and constituted to charge negatively when thus excited to a potential sufficient to prevent impingement of the succeeding electron stream, and a third group exhibiting still another primary color being slowly excitable and excited by said third uninterrupted stream, the conductance of said groups of phosphors and the structure adjacent thereto being sufficient to discharge said screen prior to the return of said electron streams to a given area according to the television scanning traverse so that said excitation and charging process may be repeated with each said traverse.

18. In a color television cathode ray reproducing system a screen comprised of a plurality of randomly-disposed unlike phosphors having different excitation periods, means to impinge a plurality of electron streams upon said screen, means to alter the intensity of said streams in accordance with television image-signal modulation, an oscillator circuit connected to each said means to impinge, in the sum to completely interrupt one less than said plurality of electron streams at different rates commensurate with the different excitation periods required for excitation of said phosphors to selectively excite said phosphors by individual streams of said plurality.

References Cited in the file of this patent

UNITED STATES PATENTS

| | | |
|---|---|---|
| 2,446,248 | Shrader | Aug. 3, 1948 |
| 2,543,477 | Sziklai et al. | Feb. 27, 1951 |
| 2,580,073 | Burton | Dec. 25, 1951 |
| 2,590,018 | Koller et al. | Mar. 18, 1952 |
| 2,635,140 | Dome | Apr. 14, 1953 |